Patented Apr. 15, 1952

2,592,580

UNITED STATES PATENT OFFICE 2,592,580

PROCESS OF PREPARING IRON OXIDE FROM FERROUS CHLORIDE

Hirsch Loevenstein, New York, N. Y., assignor to The Nitralloy Corporation, a corporation of Delaware No Drawing. Application February 9, 1945, Serial No. 577,139

6 Claims. (Cl. 23—200)

The present invention relates to the production of iron oxide and more particularly to an improved process for the production of ferric oxide in finely divided form by oxidation of ferrous chloride.

Ferric oxide in finely divided form is widely used in the arts as a pigment and in the form of rouge as a polishing material. More recently it has come to have an important use as the starting material from which finely divided metallic iron is prepared for use in powder metallurgy. The product of the present invention is particularly suitable for the above-mentioned uses and is useful for many other purposes.

Finely divided iron oxide is obtained from various sources. It has been manufactured from various waste liquors containing iron in solution with mineral acids, for example, waste liquors from the pickling of iron and ferrous chloride-containing liquors from galvanizing.

One of the methods heretofore employed in producing ferric oxide from ferrous sulfate recovered from pickling solutions or obtained in other ways has involved the calcination of the ferrous sulfate at temperatures in the neighborhood of 700 to 800° C. This process yields the oxide in the form of large lumps which contain a considerable quantity of contaminants, principally unconverted ferrous sulfate. It is necessary, therefore, to subject the product as it comes from the roasting furnace to grinding and to repeated washing or levigation to free it from the unconverted sulfate. It has also been proposed to produce ferric oxide from ferrous chloride-containing solutions by evaporating such solutions to dryness and thereafter oxidizing the resulting ferrous chloride by means of air in the presence of water vapor. Such processes suffer from the drawback that the moist hydrochloric acid vapors formed during the oxidation reaction are very corrosive, attacking readily the metal parts of the apparatus with which they come into contact, unless expensive acid resistant materials are used in the construction of the apparatus employed.

It is an object of the present invention to provide an improved process of producing ferric oxide in finely divided form.

A further object is to provide an improved process for the recovery of iron as ferric oxide from solutions of ferrous chloride.

A further object of the invention is to provide an improved process for the production of finely divided iron oxide wherein the grain size and color of the product are brought under more precise and definite control as compared to prior processes.

A still further object of the invention is to provide a process for the manufacture of ferric oxide wherein ferrous chloride monohydrate is converted with simultaneous formation of dry hydrochloric acid.

It is still another object of my invention to provide a process of recovering the iron and hydrochloric acid values of ferrous chloride-containing liquors without forming moist corrosive acid vapors and with recovery of the iron in the form of finely divided ferric oxide and recovery of the hydrochloric acid in the form of a dry gas.

It has long been known that when ferrous chloride is crystallized out from aqueous solutions the crystalline salt contains either 4 or 6 mols of water of crystallization depending on the temperature maintained during the crystallization. The hexahydrate which is formed when a saturated solution is maintained at a temperature of about 10° C. is relatively unstable and loses two of the waters of crystallization on increase of the temperature to around 12–13° C. On further heating, the waters of crystallization are progressively driven off. The first 2 waters of the tetrahydrate are driven off in heating to around 70–90° C. and on further heating at around 117° C. one of the remaining waters of crystallization is removed.

I have found that when the evaporation and subsequent dehydration of ferrous chloride crystals is so controlled as to drive off all but the final water of crystallization, the resulting dry white ferrous chloride salt, $FeCl_2 \cdot H_2O$, may be oxidized to ferric oxide by heating in the presence of air within a wide temperature range from as low as 45° C. upward, and that this oxidation is accompanied by the formation of dry hydrochloric acid gas. In other words, I have discovered that when the ferrous chloride is in the form of the monohydrate the reaction proceeds readily at relatively low temperatures and does not require the presence of moisture to promote the reaction.

I have further found that there are definite relationships between the rate of oxidation and the particle size and color of the ferric oxide produced, and that the process permits of close control of the particle size and/or color by appropriate correlation of the oxidation temperature and the supply of oxygen to the reaction zone.

As the starting material for my process I may use ferrous chloride from any suitable source. Spent baths which have been employed in the hydrochloric acid pickling of iron and steel or in connection with galvanizing form by-products which are rich in ferrous chloride and these waste materials are suitable for my process. In using such materials they should be preliminarily treated, as by settling or filtering, to separate out the insoluble impurities usually present in such waste liquors and thereby obtain a substantially clear ferrous chloride solution which is then ready for the evaporating and dehydrating steps of the process. The required ferrous chloride may be formed if desired by the action of hydrochloric acid on iron or steel scrap, such as iron turnings. Also, iron sulfate available as a commercial byproduct may be employed by first converting it to the chloride by treatment with calcium chloride, or other chlorides which yield water-insoluble sulfates, and thereafter removing the insoluble calcium sulfate or other insoluble sulfate by filtration or sedimentation. Iron ore or other iron oxide-containing raw materials may be employed by first treating them with hydrochloric acid and recovering the solution of iron chloride by filtration or other suitable operations.

In preparing iron oxide from ferrous chloride in accordance with the invention the ferrous chloride is first converted to ferrous chloride containing a single water of crystallization. When a solution of ferrous chloride is employed as the starting material, this is most conveniently accomplished by heating the solution at temperatures of about 120° C. to first evaporate the free water and drive off all but one of the waters of crystallization, thereby forming dry $FeCl_2.H_2O$. Thereafter, the dry $FeCl_2.H_2O$ is oxidized directly to $Fe_2O_3$ by heating under oxidizing conditions at any selected temperature from 45° C. upwards depending on the color and grain size desired. Only under exceptional circumstances will it be desirable from the practical economic standpoint to carry on the oxidation at temperatures above 300° C. If crystalline ferrous chloride is employed as the starting material, the crystals are first decomposed and all but one of the waters of crystallization are removed, whereupon the resulting $FeCl_2.H_2O$ is oxidized as described above.

The process may be carried out as a batch operation in a single vessel or other suitable piece of equipment by evaporating the ferrous chloride solution to the monohydrate form and then further heating the monohydrate salt in the presence of air at a sufficient temperature to promote the desired oxidation.

Alternatively, the evaporation of the solution and the controlled partial dehydration of the resulting ferrous chloride may be carried on in an evaporator and the partially dehydrated product, after it has been brought to the monohydrate state, is then transferred to a suitable roasting furnace or other apparatus wherein the ferrous chloride is heated with stirring or agitation in the presence of air while heating at a temperature sufficient to maintain the oxidation at the desired rate.

In evaporating ferrous chloride solutions or effecting the controlled dehydration of previously crystallized ferrous chloride to produce the monohydrate salt, the operation may be carried on in the presence of air as above indicated since no oxidation of the chloride will take place under evaporating conditions until all but the last of the waters of crystallization are removed. However, the process lends itself to operation according to a modification wherein the evaporating and dehydrating operations are carried on with exclusion of air.

Since in the practice of my process the ferrous chloride is converted directly to ferric oxide without passing through an intermediate ferric chloride stage, the possibility of any hydrolysis of ferric chloride to an insoluble oxychloride or iron hydroxide is obviated. The absence of water vapor insures that dry hydrochloric acid is formed in the reaction which makes possible the use of ordinary iron equipment for carrying out the process.

The temperature during the oxidation step can be kept generally lower than in former processes in which ferrous chloride is oxidized by means of steam, or water vapor, and air.

The invention will be further understood from the following examples.

*Example I*

A concentrated aqueous solution of ferrous chloride was divided into six portions hereinafter referred to as samples 1A, 2A, 3A, 1B, 2B and 3B. The samples marked A were evaporated, allowing the water liberated to freely escape, and then oxidized by heating without stirring at various temperatures in air. Samples A were treated in open vessels. The samples labelled B were treated by pouring the portions of the solution on a hot plate in a thin layer. The availability of oxygen was increased for samples B because of the thinner layer. The results are indicated in the following table:

| Sample | Temperature ° C. | Duration of Heating Hours | Thickness of Dry Layer in mm. | Quantity Recovered, grams |
|---|---|---|---|---|
| 1A | 270 | 60 | 6 | 23 |
| 2A | 170 | 125 | 6 | 28 |
| 3A | 105 | 500 | 6 | 26 |
| 1B | 270 | 0.75 | 1 | 6.5 |
| 2B | 170 | 5.25 | 1 | 6.5 |
| 3B | 105 | 27 | 1 | 7.5 |

The color of the products varied from deep purple to red-orange in the following order: 1A, 2A, 3A, 1B, 2B, 3B. The grain size varied downwardly in the following order: 1A, 2A, 1B, 2B, 3A, 3B.

From time to time samples were taken and examined for ferrous and ferric chloride. In every case the soluble iron was found to be in the ferrous state.

Due to the absence of added water vapor and the freedom of the water liberated from the iron chloride to escape from the reaction zone, the iron chloride was converted to a white salt ($FeCl_2.H_2O$) in each case before oxidation began.

*Example II*

A concentrated solution of ferrous chloride was evaporated at 118° C. and until white $FeCl_2.H_2O$ was formed. The residue was then transferred to a mortar heated to 160° C. and periodically ground. After 26 hours the salt had been completely converted to ferric oxide of a deep red color similar to that of sample 1B of Example I but the grain size was much finer than that of sample 1B.

It will be observed from the examples that the oxidation is capable of control as desired to govern the color and the particle size of the final iron oxide. Higher temperatures in general result in a final product of darker color when other conditions are maintained unchanged. Higher temperatures also result in a larger grain size, other conditions remaining the same. The rate of oxidation of the ferrous chloride is also subject to control independently of the temperature employed, by variation of the amount of air available for oxidation either by adjustment of the amount of air supplied, variation of the thickness of the layer of ferrous chloride undergoing oxidation or by controlled stirring. The more rapidly oxidation is effected, the lighter the color of the ensuing product when operating at a given temperature. Likewise, smaller particle sizes result from more rapid oxidation when operating at a given temperature. Decrease in grain size, however, does not follow proportionately the change in color produced by lowering of the temperature of oxidation, or increasing the availability of air for oxidation. It is therefore possible by use of the present process to control both color and grain, each independently of the other. It is possible, for example, to obtain two different products of the same color but differing in particle size by oxidizing one at high temperature in the presence of a large amount of oxygen and the other at low temperature and at a lower availability of oxygen. The product produced at the higher temperature will be the same color as the other but will have a larger grain size. It is likewise possible to obtain two products of the same particle size but differing in color. Thus products of a given desired particle size may be produced in different colors and products of a desired color shade may be provided in different particle sizes.

The iron oxide produced by my process will find use generally for the various purposes for which iron oxide has been used heretofore. The process is particularly suitable for the production of iron oxide pigments because of the excellent control of color shade and particle size which it affords. The product is also particularly suitable for the formation of iron particles, by reduction of the oxide, for uses in powder metallurgy when close control of the particle size of the iron powder is desired. The process also has special advantages when applied to the manufacture of polishing rouges.

It will be appreciated that the process may be carried out as a cyclic operation in respect of the use and recovery of the hydrochloric acid formed in the oxidation stage of the process. Since the hydrochloric acid may be and preferably is recovered as a dry or substantially dry gas, the applications of the invention in cyclic operations are greatly multiplied and may include the treatment of iron ores and other ferrous materials under conditions of either dry or wet chlorination in forming the initial ferrous chloride which is to be converted into iron oxide and hydrochloric acid in the practice of the process.

Where herein reference has been made to the use of "air" as the oxidizing agent, it is to be understood as including any oxidizing gas that will promote the oxidizing reaction without introducing undesirable by-products or other complications in the practice of the process. As more common examples may be mentioned oxygen and oxygen-enriched air.

It will also be understood that when atmospheric air is used it will contain more or less but relatively small amounts of water unless drying of the air is resorted to. Where herein I have referred to the production of "dry" hydrochloric acid, I do not mean to exclude the presence of moisture in the amounts that may be brought into the gases produced by reason of a normal or average humidity of the atmospheric air brought to the oxidizing zone. If hydrochloric acid gas of absolute dryness is desired or the operations are being conducted in a region where or under weather conditions when the air carries an inordinate amount of moisture, it will be understood that any of the appropriate methods of drying the air preliminary to leading it to the oxidizing zone may be used.

It will be understood that the process lends itself to the use of widely differing types of evaporating and roasting or other types of equipment in which the dried and partially dehydrated chloride may be treated. It will also be understood that various changes may be made in the details of the process without departing from the invention which is not to be deemed limited otherwise than as indicated by the scope of the appended claims.

I claim:

1. The process of recovering the iron and chlorine values of a ferrous chloride polyhydrate salt which comprises heating the ferrous chloride salt at a temperature up to but not over about 120° C. and continuing heating at about said temperature until only one water of crystallization remains, thereafter heating in air the monohydrate salt so produced in the absence of water vapor at a temperature in the range 45°–300° C. to decompose it into ferric oxide and dry HCl gas, and recovering the iron oxide and the HCl, the latter being obtained in dry form.

2. A continuous process for preparing finely divided ferric oxide from ferrous materials which comprises treating the ferrous material with aqueous hydrochloric acid to form an aqueous ferrous chloride solution, evaporating the solution to dryness and continuing heating of the resulting ferrous chloride polyhydrate at a temperature and for a period of time sufficient to drive off all but the last water of crystallization, thereafter oxidizing the remaining monohydrate salt in the absence of water vapor at a temperature in the range 45°–300° C. to form ferric oxide and dry HCl gas, recovering the ferric oxide, recycling the HCl gas in a dry state to the first treatment zone, and then converting the HCl into aqueous hydrochloric acid to treat additional ferrous material to form more ferrous chloride for use in the process.

3. The process of preparing finely divided ferric oxide which comprises evaporating a ferrous chloride solution until all water is removed except water of crystallization, thereafter dehydrating the resulting ferrous chloride polyhydrate salt until all water except one mol of water of crystallization is removed therefrom, then heating the ferrous chloride monohydrate so produced in air and in the absence of water vapor at a temperature within the range 45°–300° C. to produce therefrom ferric oxide and dry hydrochloric acid gas, and recovering the iron oxide and the HCl, the latter being obtained in dry form.

4. The process for the production of finely divided ferric oxide which comprises oxidizing $FeCl_2.H_2O$ in the presence of air and in the absence of water vapor at a temperature between 45° and 170° C.

5. The process for the production of finely divided ferric oxide which comprises oxidizing $FeCl_2.H_2O$ in the presence of air and in the absence of water vapor at a temperature of about 105° C.

6. A process for producing finely divided ferric oxide from ferrous chloride monohydrate which comprises dehydrating ferrous chloride hexahydrate until all water except one mole of water of crystalization is removed therefrom and then heating the ferrous chloride monohydrate so produced in air and in the absence of water vapor at a temperature between 45° and 170° C. to decompose it into ferric oxide and dry hydrochloric acid gas.

HIRSCH LOEVENSTEIN.

REFERENCES CITED

The following references are of record in the file of this patent:

UNITED STATES PATENTS

| Number | Name | Date |
|---|---|---|
| 1,287,939 | Fireman | Dec. 17, 1918 |
| 1,630,881 | Zalocostos | May 31, 1927 |
| 1,813,649 | Weise | July 7, 1931 |
| 1,938,461 | Prutton | Dec. 5, 1933 |
| 2,017,773 | Smith et al. | Oct. 15, 1935 |
| 2,394,579 | Ayers | Feb. 12, 1946 |

FOREIGN PATENTS

| Number | Country | Date |
|---|---|---|
| 830 of 1883 | Great Britain | Feb. 15, 1883 |
| 307,190 | Great Britain | Feb. 10, 1928 |

OTHER REFERENCES

Mellor, "Treatise on Inorganic and Theoretical Chemistry," vol. 14, pages 13 and 16. Longmans, Green & Co., 1935.